(12) United States Patent
Olivotti et al.

(10) Patent No.: US 9,069,363 B2
(45) Date of Patent: Jun. 30, 2015

(54) METHOD AND APPARATUS FOR REGULATING THE TEMPERATURE OF A PLURALITY OF ROOMS IN A BUILDING

(75) Inventors: Sergio Olivotti, Cibiana di Cadore (IT); Umberto Bertolotti, Prevalle (IT)

(73) Assignee: I.V.A.R. S.P.A., Prevalle (IT)

( * ) Notice: Subject to any disclaimer, the term of this patent is extended or adjusted under 35 U.S.C. 154(b) by 498 days.

(21) Appl. No.: 13/582,343

(22) PCT Filed: Dec. 23, 2010

(86) PCT No.: PCT/IB2010/056047
§ 371 (c)(1),
(2), (4) Date: Aug. 31, 2012

(87) PCT Pub. No.: WO2011/114200
PCT Pub. Date: Sep. 22, 2011

(65) Prior Publication Data
US 2013/0056543 A1    Mar. 7, 2013

(30) Foreign Application Priority Data
Mar. 17, 2010  (IT) .............................. MI2010A0433

(51) Int. Cl.
*F24D 19/10*  (2006.01)
*G05D 23/19*  (2006.01)
(Continued)

(52) U.S. Cl.
CPC ........ *G05D 23/1934* (2013.01); *F24D 19/1009* (2013.01); *F24D 19/1018* (2013.01); *Y02B 30/762* (2013.01)

(58) Field of Classification Search
CPC .......... G05D 23/1934; G05D 23/1927; G05D 23/1917; G05D 23/203; F24D 19/1018; F24D 19/1006; F24D 19/1003; F24D 19/1009; F24D 3/02; Y02B 30/762

USPC ......... 237/8 A, 8 B, 8 R, 12, 2 A, 91; 236/37, 236/9 R, 9 A, 1 B, 1 C
See application file for complete search history.

(56) References Cited

U.S. PATENT DOCUMENTS

| 297,937 | A | * | 4/1884 | Johnson | ......................... 236/9 R |
| 1,792,101 | A | * | 2/1931 | Larson | ............................. 236/47 |

(Continued)

FOREIGN PATENT DOCUMENTS

| DE | 3510873 A1 | * | 10/1986 | ................ F24D 3/02 |
| DE | 4134865 A1 | | 4/1993 | |

(Continued)

*Primary Examiner* — Steven B McAllister
*Assistant Examiner* — Daniel E Namay
(74) *Attorney, Agent, or Firm* — Pearne & Gordon LLP

(57) ABSTRACT

A method for regulating a temperature in a plurality of rooms (3) of a building, comprising steps of detecting a first ambient temperature measurement (TaI) in a first room (3a) with use of a thermostat (5) destined to command functioning of a first heat-regulating device (8a) mounted on a first radiator (4a) arranged in the first room (3 a), in a correlated way with the first ambient temperature measurement (TaI) and with a first set value (Tset1) of a desired temperature in the first room (3 a), detecting a first proximal temperature (Tpr1) by means of a first sensor (9a) arranged in proximity of the first radiator (4a), detecting a second ambient proximal temperature measurement (Tpr2) in a second room (3b) by means of a second sensor (9b) arranged in proximity of a second radiator (4b), correlating the measurement of the second proximal temperature (Tpr2) with a second set value (Ofs2) for a second heat-regulating device (8b) and also at least with the first proximal temperature measurement (Tpr1) in order to obtain a second command value for the second radiator (4b), and commanding functioning of the second heat-regulating device (8b) mounted on the second radiator (4b) in a correlated way with the second command value.

17 Claims, 4 Drawing Sheets

(51) Int. Cl.
  *G05D 23/20* (2006.01)
  *G05D 27/02* (2006.01)
  *F24D 3/02* (2006.01)

(56) References Cited

U.S. PATENT DOCUMENTS

| | | | | |
|---|---|---|---|---|
| 2,661,907 | A * | 12/1953 | Wissmiller | 237/9 R |
| 3,351,128 | A * | 11/1967 | Barnd | 165/219 |
| 4,192,455 | A * | 3/1980 | Rasmussen et al. | 237/8 R |
| 4,279,381 | A * | 7/1981 | Yueh | 237/81 |
| 5,178,324 | A * | 1/1993 | Moesby | 237/8 R |
| 5,318,104 | A * | 6/1994 | Shah et al. | 165/208 |
| 5,704,545 | A * | 1/1998 | Sweitzer, Jr. | 237/8 R |
| 5,789,722 | A * | 8/1998 | Zimmerman et al. | 219/486 |
| 6,591,901 | B2 * | 7/2003 | Bujak, Jr. | 165/209 |
| 6,644,398 | B2 * | 11/2003 | Bujak, Jr. | 165/209 |
| 7,658,335 | B2 * | 2/2010 | Johnson, Jr. | 237/8 R |
| 2003/0216837 | A1 * | 11/2003 | Reich et al. | 700/276 |
| 2005/0051637 | A1 | 3/2005 | Hansen | |
| 2005/0161517 | A1 * | 7/2005 | Helt et al. | 236/1 C |
| 2006/0113398 | A1 * | 6/2006 | Ashworth | 236/44 C |
| 2008/0179415 | A1 * | 7/2008 | Johnson | 237/8 A |
| 2008/0179416 | A1 * | 7/2008 | Johnson et al. | 237/8 A |
| 2010/0276502 | A1 * | 11/2010 | Beckett | 237/8 A |

FOREIGN PATENT DOCUMENTS

| | | | | |
|---|---|---|---|---|
| GB | 2062216 | A * | 5/1981 | F24D 3/00 |
| GB | 2462143 | A | 2/2010 | |
| WO | 03/027790 | A1 | 4/2003 | |

* cited by examiner

FIG.3
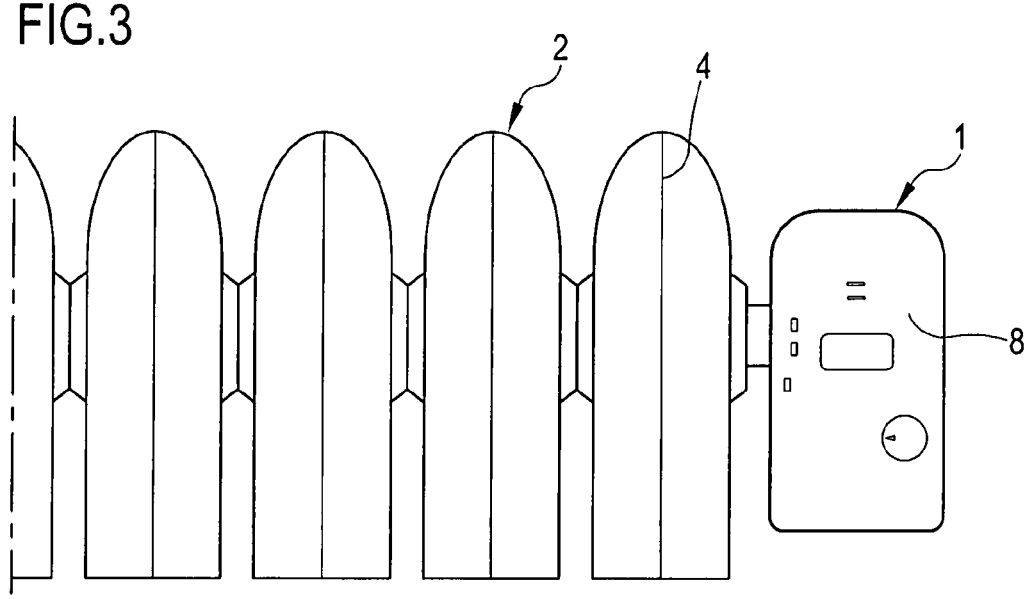
FIG.4
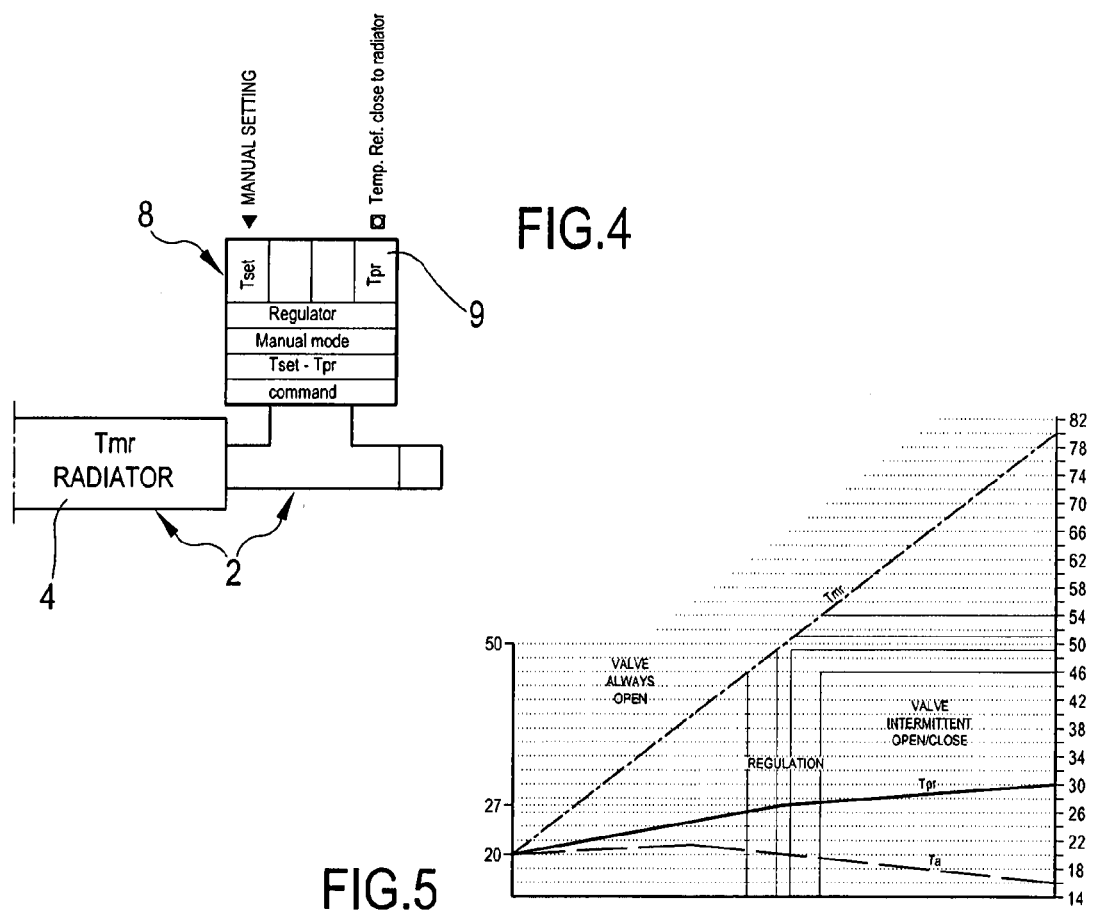
FIG.5

METHOD AND APPARATUS FOR REGULATING THE TEMPERATURE OF A PLURALITY OF ROOMS IN A BUILDING

The present invention relates to a method and an apparatus for regulating the temperature in a plurality of rooms of a building.

In particular, the invention is advantageously applicable for regulating the temperature in rooms of residential- or commercial-type buildings provided with radiating heating elements, but it could also be advantageously used in other types of plants.

The prior art comprises various types of heating plants for residential or commercial buildings, among which, for example, rising column plants, with usually one or more radiating elements or radiators in each room. In this case a thermostat is usually provided in at least one room for each apartment or dwelling unit, which thermostat comprises a sensor for detecting the ambient temperature, and which can be set, generally manually, such as to define a desired temperature in the ambient. The thermostat commands the functioning of the heating plant such as to define the quantity of heat which is supplied by a boiler to the heating elements via hot-water conveying pipes, in order to bring the effective temperature of the room towards the thermostat-set temperature.

Use of chrono-thermostats is also known, which enable a timed programming of the temperature in the apartment and which command the functioning of the heating plant in accordance with the programming. Also known, in the case of the use of radiators, is a heat-regulating element which enables defining and further differentiating the desired temperature for each specific radiator, and therefore for the relative room the radiator is installed in, with respect to the temperature defined by the thermostat for the whole apartment.

The heat-regulating elements can be constituted by thermostat heads, which comprise a thermostat acting on a check valve of the fluid flowing in the heating plant in order to regulate the quantity of fluid which can enter the radiator and thus modify the temperature of the radiator and the quantity of heat supplied to the room in which the radiator is installed. Each thermostat head in general enables manual regulation of an initial set position, generally indicated with a numbering of the simply indicative type, which enables the temperature in the specific room to be approximately varied with respect to the temperature defined for the whole apartment by the thermostat or chrono-thermostat.

A second type of heat-regulating element of known type is constituted by motorized actuators which comprise a small electric motor acting on the check valve. The electric motor can be powered by a battery or by the electric grid supply and is commanded on the basis of a sensor, mounted in the actuator, which detects the temperature in the room and consequently commands the opening or closing movement of the motor, and therefore the check valve.

These actuators are also provided with a regulation of an initial setting position, which can also be manual or remote-controlled directly by the thermostat or chrono-thermostat.

The present applicant has found that the known-type heating plants cited and briefly described herein above exhibit some drawbacks. It is also worthy of note that the sensors housed in the actuators mounted on the radiators necessarily detect a temperature proximal to the radiator, i.e. a temperature in the close vicinity of the radiator. This proximal temperature does not correspond to the effective temperature in the room the radiator is installed in, but rather corresponds to an intermediate temperature between the room temperature and the actual radiator temperature, in which, as is known, water at a high temperature flows (for example in the 30-90° C. range).

Further, the temperature of the radiator is not constant over time, but is subject to relevant variations, going from a temperature close to that of the room when the radiator is checked, up to a much higher temperature when water is running in the radiator that is supplied by the heating plant. Further, the heating water is also not always at the same temperature, but according to the settings of the boiler and the thermostat, and other factors, its temperature can vary significantly, for example from about 30° to about 90° C.

The above factors are such that the functioning of the heat-regulating devices, both in the case of thermostat heads and motorized actuators, is very approximate, and in some circumstances very imprecise. This leads to an imprecise regulation of the temperature in the rooms of each dwelling in which a thermostat is not present. The thermostat is provided with a sensor that can detect the effective temperature in the room it is situated in and therefore can command the functioning of the plant correctly and precisely at least as far as the room in which the thermostat itself is installed.

To summarise, the above-cited problem obtains in the use of heat-regulating devices in different rooms to the one in which the thermostat is located, as the further setting of the heat-regulating devices is necessarily imprecise and altered by uncontrollable factors, as the relative command sensor detects a temperature that is proximal to the radiator and therefore strongly influenced by the temperature of the radiator itself. This means that the heat-regulating device tends to raise the temperature excessively, by completely opening the relative check valve, in a case in which the radiator is at a low temperature, while it tends to lower the temperature excessively, closing the check valve, when the radiator is very hot.

This effect leads to various drawbacks, such as imprecise regulation of the temperature in the relative rooms, an intermittent functioning of the heat-regulating device, which can wear it out prematurely, and also a waste of energy, as the plant is not used optimally.

A main aim of the present invention is to obviate one or more of the problems encountered in the prior art.

An aim of the present invention is to provide a method and an apparatus for regulating the temperature in a plurality of rooms of a building which enables effectively regulating, in a precise and/or rapid way, the temperature in all the room of a dwelling unit.

A further aim of the present invention is to provide a method and an apparatus for regulating the temperature in a plurality of rooms of a building which offer a high level of comfort to users, as a desired temperature is guaranteed for each room of a building.

A further aim of the present invention is to provide a method and an apparatus for regulating the temperature in a plurality of rooms of a building, which method and apparatus enable optimization of the energy consumption of the heating plant.

A further aim of the present invention is to provide a method and an apparatus for regulating the temperature in a plurality of rooms of a building, which method and apparatus provide a long working life and prevent failure of components of the heating plant.

A further aim of the present invention is to provide a method and an apparatus for regulating the temperature in a plurality of rooms of a building, which method and apparatus are flexible and adaptable to the needs of the various users.

A further aim of the present invention is to make available a method and an apparatus for regulating the temperature in a plurality of rooms of a building, which method and apparatus are simple and economical to realize.

These aims and more besides, which will more fully emerge from the following description, are substantially attained by a method and an apparatus for regulating the temperature in a plurality of rooms of a building according to what is set out in one or more of the appended claims, taken singly or in combination.

The invention further relates to an apparatus of one or more of the appended apparatus claims, in which a second command value is calculated, correlating a measurement of a second proximal temperature with a second setting value for a second heat-regulating device, with a measurement of a first proximal temperature, and further with a time setting value defined by a chrono-thermostat.

The invention further relates to an apparatus of one or more of the appended device claims, and further comprises at least a calculating device configured such as to correlate at least the measurement of the first proximal temperature with the first ambient temperature in order to obtain a corrective value.

The invention further relates to an apparatus of one or more of the appended apparatus claims, wherein the thermostat or chrono-thermostat comprises the calculating device and in which a central data transmission device is configured such as to receive the measurement of the first proximal temperature from the first sensor of the first heat-regulating device and for further transmitting a corrective value at least to the second heat-regulating device or to a plurality of heat-regulating devices.

The invention further relates to an apparatus in which the thermostat or chrono-thermostat is configured such as to subtract the first ambient temperature measurement and the measurement of the first proximal temperature in order to obtain the corrective value.

The invention further relates to an apparatus of one or more of the appended apparatus claims, in which the second heat-regulating device and/or each of the plurality of heat-regulating devices comprises one of the above-mentioned calculating devices in order to correlate at least the temperature values and to calculate the command values.

The invention further relates to an apparatus according to one or more of the appended apparatus claims, in which each of the heat-regulating devices is provided with a manual regulation such that the respective setting can be defined.

The invention further relates to an apparatus of one or more of the appended apparatus claims, in which the heat-regulating device or the plurality of heat-regulating devices are configured such as to correct the measurement of the second proximal temperature or the plurality of proximal temperature measurements, in order to estimate a second ambient temperature measurement in the second room or a plurality of ambient temperature measurements in a respective plurality of rooms of the building.

The invention further relates to an apparatus of one or more of the appended apparatus claims, wherein each heat-regulating device comprises a motorized element destined to activate a relative check valve for the heating fluid circulating in a corresponding radiator.

The invention further relates to an apparatus of one or more of the appended apparatus claims, in which the data transmission devices are wireless or wired types.

The invention further relates to an apparatus of one or more of the appended apparatus claims, in which the ambient sensor is separated from the thermostat or chrono-thermostat and is operatively connected thereto.

The invention further relates to an apparatus of one or more of the appended apparatus claims, in which each data transmission device is provided with its own univocal identification code.

The invention further relates to an apparatus of one or more of the appended apparatus claims, wherein the chrono-thermostat is provided with a memory for storing a timing program of the temperature and is configured such as to transmit the data relating to the timing programming and/or relating to the time setting of the heat-regulating devices.

The invention further relates to an apparatus for regulating the temperature in a plurality of rooms in a building comprising a heating plant having a plurality of radiators arranged in respective rooms and an apparatus for regulating the temperature in a plurality of rooms, as in any one of the appended apparatus claims.

The invention further relates to a method as in one or more of the appended method claims, in which the first temperature setting value is defined by a thermostat or chrono-thermostat operatively active for commanding the functioning of at least the first heat-regulating device.

The invention further relates to a method as in one or more of the appended method claims, in which the second setting value is defined by a manual regulation of the second heat-regulating device or by means of an automatic regulating of the second heat-regulating device which is defined and commanded by a chrono-thermostat.

The invention further relates to a method as in one or more of the appended method claims, in which the second command value is calculated by subtracting the measurement of the second proximal temperature from the measurement of the first proximal temperature and adding the second setting value and/or the timed setting value defined by the chrono-thermostat.

The invention further relates to a method as in one or more of the appended method claims, further comprising a step of correlating the measurement of the first proximal temperature with the first ambient temperature measurement such as to obtain a corrective value, and a step of transmitting the corrective value at least to the second heat-regulating device or to the plurality of heat-regulating devices.

The invention further relates to a method as in one or more of the appended method claims, in which the corrective value is given by the difference between the first ambient temperature measurement and the first proximal temperature measurement or in which the corrective value is a command parameter correlated to the difference between the first ambient temperature measurement and the measurement of the first proximal temperature.

The invention further relates to a method as in one or more of the appended method claims, further comprising a step of correcting the measurement of the second proximal temperature or the plurality of proximal temperature measurements with the corrective value in order to estimate a second ambient temperature measurement in the second room or a plurality of ambient temperature measurements in the respective plurality of rooms of the building.

The invention further relates to a method as in one or more of the appended method claims, in which the steps of detecting a first ambient temperature measurement in a first room by means of an ambient sensor and correlating the measurement of the first proximal temperature with the ambient temperature in order to obtain a corrective value are performed using a calculating device integrated in the thermostat or the chrono-thermostat.

A detailed description will now be made, by way of non-limiting example, of some preferred embodiments of a method and an apparatus for regulating the temperature in a plurality of rooms of a building, in which:

FIG. 3 is a front view of a detail of a radiator of the plant of FIG. 1, with a heat-regulating device mounted on the radiator;

FIG. 4 is a schematic representation of a heat-regulating device according to the prior art, and the functioning thereof;

FIG. 5 is a diagram schematically representing the progression of some temperatures in a room in which the device of FIG. 4 is installed;

Figure 1:
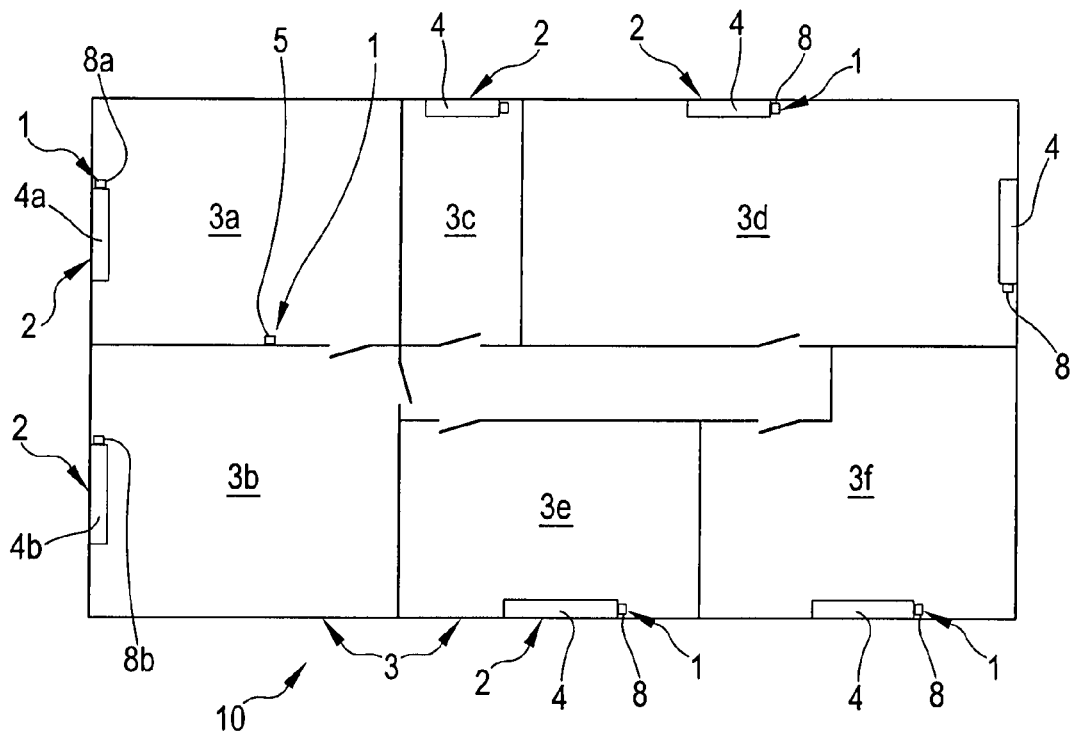
FIG. 1 is a schematic plan view of a dwelling unit which is a part of a building and in which a heating plant and an apparatus for regulating the temperature are installed.

The figures illustrate, by way of non-limiting example, an example of a heating plant 2, but the invention is also applicable to heating systems that are different to the one illustrated.

With reference to the accompanying figures, 1 denotes in its entirety an apparatus for regulating the temperature in a plurality of units or rooms of a building or dwelling unit 10 in accordance with the present invention.

The invention further relates to a plant for regulating the temperature in a plurality of units or rooms 3 of a building 10 comprising a heating plant 2 having a plurality of radiators 4 arranged in respective rooms 3 and an apparatus 1 for regulating the temperature in accordance with what is set out herein below. The apparatus 1 for regulating the temperature in a plurality of units or rooms 3 of a building comprises a thermostat or chrono-thermostat 5 provided at least with an ambient sensor 6 destined to detect a first ambient temperature measurement Ta1 in a first room 3a and also provided with at least a central device 7 for data transmission. In a variant, the ambient sensor 6 might be separate from the thermostat or chrono-thermostat 5 and operatively connected thereto.

The regulating apparatus 1 further comprises at least a first heat-regulating device 8a mounted on a first radiator 4a belonging to the heating plant 2 and arranged in the first room 3a. The first heat-regulating device 8a is destined to regulate the functioning of the first radiator 4a in conformity with the commands received from the thermostat or chrono-thermostat 5, by means of a wireless or wired connection realized via a plurality of transmission devices, and can comprise for example an actuator with an electric motor and destined to move a check valve of the fluid which flows in the heating plant 2 towards the first radiator 4a (these components are not illustrated in the figures as they are of known type).

The first heat-regulating device 8a comprises at least a first sensor 9a destined to detect a measurement of a first proximal temperature Tpr1 at the first radiator 4a and a first peripheral device 11a for data transmission configured at least such as to transmit the measurement of the first proximal temperature Tpr1.

The first peripheral device 11a for data transmission acts to receive and re-transmit the necessary information from and to the thermostat or chrono-thermostat 5 and further, as will be explained in greater detail herein below, the measurement of the first proximal temperature Tpr1, which can be transmitted to the thermostat or chrono-thermostat 5 or to other heat-regulating devices 8 applied to other radiators 4 in different rooms 3 in the building 10.

Figure 6:
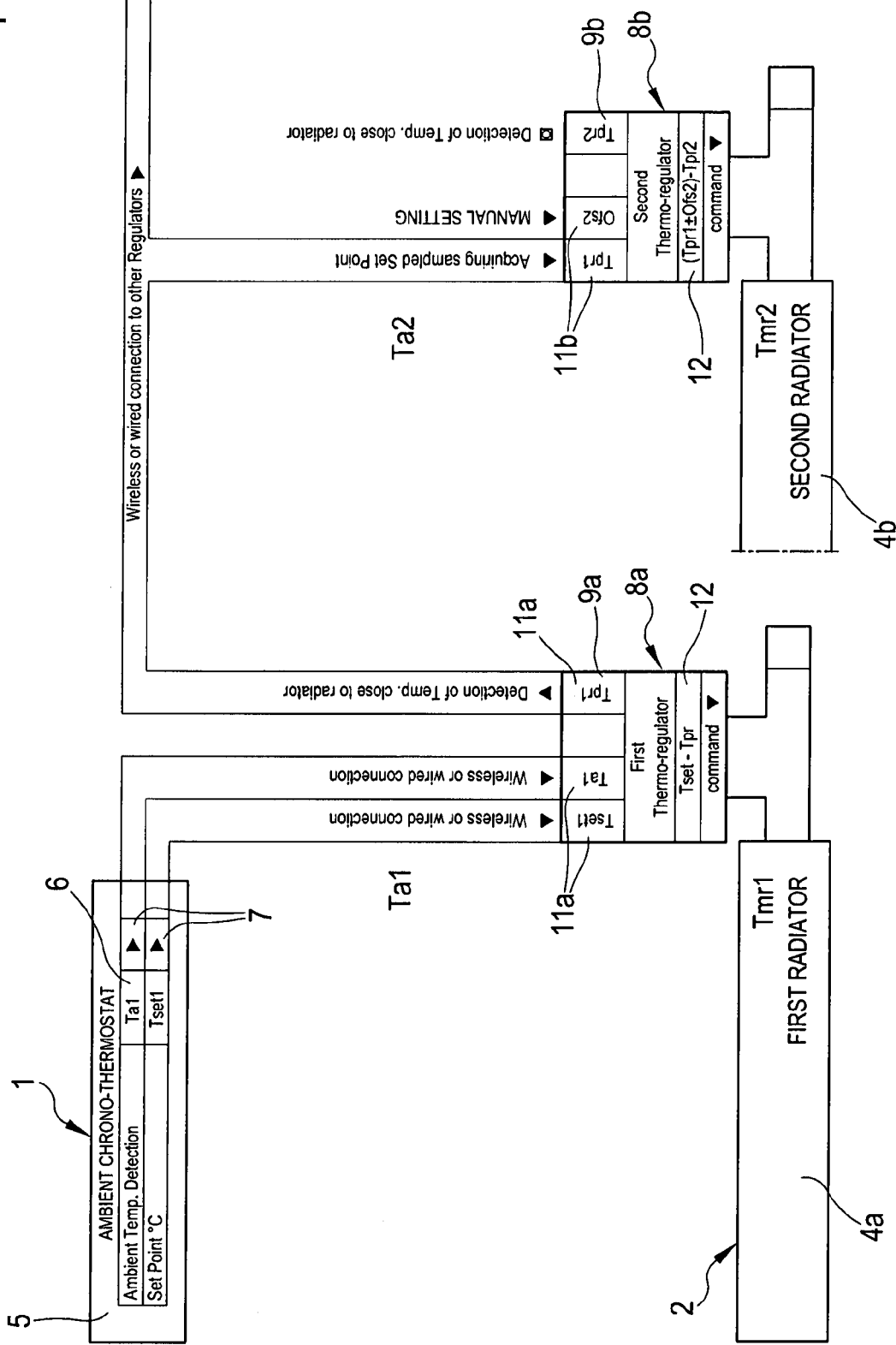
FIG. 6 is a schematic representation of an apparatus for regulating the temperature in a plurality of rooms of a building and the relative functioning, in accordance with an embodiment of the invention.

As illustrated in FIG. 6, the commands sent by the thermostat or the chrono-thermostat 5 to the first heat-regulating device 8a via the central device 7 for data transmission comprise at least the first ambient temperature measurement Ta1 and a first set value Tset1 of the first heat-regulating device 8a.

Alternatively these commands can comprise a differential value between the first ambient temperature measurements Ta1 and the first set value Tset1, or a command signal that is correlated or in some way proportional to the first ambient temperature measurement Ta1 and the first set value Tset1.

The regulating apparatus further comprises at least a second heat-regulating device 8b mounted on a second radiator 4b of the correlated heating plant 2, operatively connected to the first radiator 4a and located in a second room 3b of the building. The second heat-regulating device 8b comprises at least a second sensor 9b destined to detect a measurement of a second proximal temperature Tpr2 at the second radiator 4b and a second peripheral device 11b for data transmission, configured such as to receive at least the measurement of the first proximal temperature Tpr1. The second heat-regulating device 8b is configured such as to regulate the functioning of the second radiator 4b in a way which is correlated to the measurement of the second proximal temperature Tpr2, at a second set value, or offset value Ofs2 for the second heat-regulating device 8b and to the measurement of the first proximal temperature Tpr1. For example, each heat-regulating device 8 can comprise a calculating device 12 destined to correlate the values and provide a command value for the heat-regulating device 8.

As can be seen in FIG. 1, the regulating apparatus 1 further comprises a plurality of heat-regulating devices 8 mounted on a corresponding plurality of radiators 4 of the heating plant 2, operatively connected to the first radiator 4a and arranged in a plurality of respective rooms 3 of the building. Each heat-regulating device 8 is alike to the above-mentioned second heat-regulating device 8b, and therefore comprises a respective sensor 9 destined to detect a respective proximal temperature Tpr at the respective radiator in the respective room, and further comprises a respective peripheral device 11 for data transmission for receiving at least the measurement of the first proximal temperature Tpr1. Each heat-regulating device is further reconfigured such as to regulate the functioning of the respective radiator in a correlated way with the respective proximal temperature Tpr, at a respective set value Ofs for the relative heat-regulating device 8 and the measurement of the first proximal temperature Tpr1.

In a first embodiment, as illustrated in FIG. 6, each of the heat-regulating devices 8 can be provided with a manual regulation which enables defining the respective set or offset value Ofs (similarly to what occurs in the prior-art solution illustrated in FIG. 4).

Figure 7:
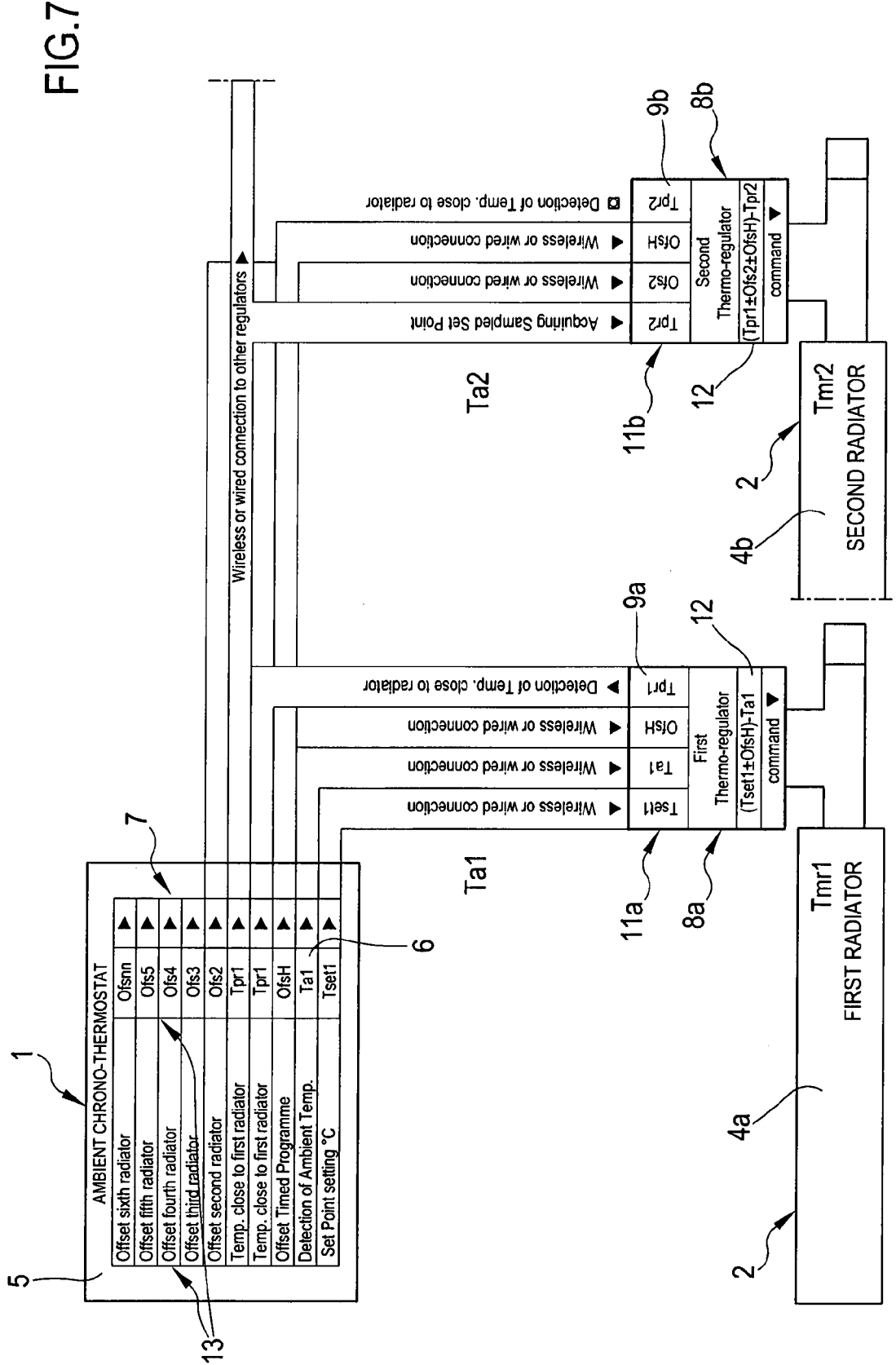
FIG. 7 is the same view as in FIG. 6, relating to a second embodiment of the invention.

In the second embodiment of FIG. 7 the chrono-thermostat is configured such as to define at least the set or offset values Ofs of each heat-regulating device 8 and the central device 7 for data transmission is configured such as to transmit the set values Ofs to each heat-regulating device 8. The chrono-thermostat can be further configured, as illustrated in FIG. 7, such as further to define at least a time set value OfsH, variable in time in conformity with a timed programming of the chrono-thermostat, and in that case the central device 7 for data transmission is configured such as to transmit at least the time set value OfsH to each heat-regulating device 8. In such a case the second command value is calculated by correlating the measurement of the second proximal temperature Ppr2 with the second set vale Ofs2 for the second heat-regulating device 8b, with the measurement of the first proximal temperature Tpr1 and further with a set time value OfsH defined by the chrono-thermostat.

The regulating apparatus further comprises at least a calculating device 12 configured such as to correlate at least the measurement of the first proximal temperature Tpr1 with the first ambient temperature measurement Ta1 in order to obtain a corrective value Vc. For example, the calculating device 12 of the thermostat or chrono-thermostat 5 can be configured such as to subtract the first ambient temperature measurement Ta1 and the measurement of the first proximal temperature Tpr1 in order to obtain the corrective value Vc. The chrono-thermostat comprises the calculating device 12. In this case the central device 7 for data transmission is configured such as to receive the measurement of the first proximal temperature Tpr1 from the first sensor 9a of the first heat-regulating device 8a and further for transmitting the corrective value at least to the second heat-regulating device 8b to the plurality of heat-regulating devices 8.

Further, each heat-regulating device 8 comprises one of the calculating devices 12, in order to perform the above-mentioned correlations between the temperatures and the set or offset values. In a variant which is not illustrated, the second heat-regulating device 8b or the plurality of heat-regulating devices 8 can further be configured such as to correct the proximal temperature measurement by means of the corrective value, in order estimate a second ambient temperature measurement in the respective plurality of rooms 3 of the building.

The above-cited data transmission devices 7, 11 are of the wireless type, but alternatively they could also be wired. Each data transmission device 7, 11 is provided with its own univocal identification code, in order to enable univocal recognition of each heat-regulating device and/or the thermostat.

The invention also relates to a method for regulating the temperature in a plurality of rooms in a building. A method of the invention comprises steps of: detecting a first ambient temperature Ta1 in a first room 3a by means of an ambient sensor 6, commanding the functioning of a first heat-regulating device 8a mounted on a first radiator 4a arranged in the first building 3a and being part of a heating plant 2, in a correlated way with the first ambient temperature Ta1 measurement and a first set value Tset1 of the desired temperature for the first room 3a; detecting a measurement of a first proximal temperature Tpr1 in the first room 3a by means of a first sensor 9a arranged in proximity of the first radiator 4a; detecting a measurement of a second proximal temperature Tpr2 in a second room by means of a second sensor 9b arranged in proximity of a second radiator 4b, arranged in the second room, being a part of the heating plant 2 and operatively connected to the first radiator 4a; correlating the measurement of the second proximal temperature Tpr2 with a second set value Ofs2 for a second heat-regulating device 8b and further at least with the measurement of the first proximal temperature Tpr1 for obtaining a second command value for the second radiator 4b; and commanding the functioning of the second heat-regulating device 8b, mounted on the second radiator 4b, in a correlated way with the second command value.

By the term "correlate" in relation to the above temperature or set measurements, we intend establishing a relation or mathematical formula which comprises the values for supplying a result that is useful for the aims of the present invention, for example by summing or subtracting the values appropriately, but other types of correlation are also possible for the aims of the invention.

Where it is stated that a certain operation is done "in a correlated way" with one or more values, we intend using the value or values in the calculating formula destined to define the way of performing the operation itself, for example using the value as an addend in the calculating formula of interest.

Where it is indicated that a value is "correlated" to another, it is meant that those values are in some way connected, for example via a proportionality relation or another correlation relation suitable for the situation. The first temperature set value Tset1 is defined by the thermostat or chrono-thermostat 5 operatively active for commanding the functioning of at least the first heat-regulating device. The second set value Ofs2 can be defined by a manual regulation of the second heat-regulating device 8b, but in the invention it is advantageously defined by means of an automatic regulation of the second heat-regulating device via an automatic regulation of the second heat-regulating device 8b defined and commanded by the chrono-thermostat. The second command value can be calculated by correlating the measurement of the second proximal temperature Tpr2 with the second set value Ofs2 for the second heat-regulating device 8b and further at least with a value correlated to the measurement of the first proximal temperature Tpr1 or with a difference between the measurement of the first proximal temperature Tpr1 and the first temperature of the first set value Tset1 of the desired temperature for the first room 3a. In other terms, for the calculation of the second command value it is possible to use either directly the measurement of the first proximal temperature, Tpr1, received directly from the first heat-regulating device 8a or from the thermostat or chrono-thermostat 5, or in a variant it is possible to use a value in some way correlated to the measurement of the proximal temperature Tpr1 or derived from it. The second command value can be calculated by correlating the measurement of the second proximal temperature Tpr2 with the second set value Ofs2 and for the second heat-regulating device 8b, with the measurement of the first proximal temperature Tpr1 and further with a time set value OfsH defined by the chrono-thermostat. The second command value in this case is calculated by subtracting the measurement of the second proximal temperature Tpr2 from the measurement of the first proximal temperature Tpr1 and adding the second set value Ofs2 and/or the time set value OfsH defined by the chrono-thermostat.

The method further comprises steps of: detecting a plurality of proximal temperature measurements Tpr in a plurality of rooms 3 in the building by means of a plurality of respective sensors arranged in proximity of a plurality of respective radiators 4, operatively connected to the first radiator 4a and being a part of the heating plant 2; correlating the plurality of proximal temperature measurements Tpr with a plurality of set values Ofs for a plurality of heat-regulating devices 8 and further at least with the measurement of the first proximal temperature Tpr1 in order to obtain a plurality of command values for the plurality of radiators 4; and commanding the functioning of a plurality of heat-regulating devices 8 mounted on the plurality respective radiators 4 in the plurality of rooms 3 on the basis of the plurality of command values.

The method further comprises the step of transmitting at least the measurement of the first proximal temperature Tpr1, and/or the corrective value and/or the first ambient temperature Ta1 and/or the time set value OfsH defined by the chrono-thermostat, to the second heat-regulating device 8b or to the plurality of heat-regulating devices 8, by means of a transmission system of either wireless or wired type.

In a variant, the method can further comprise the step of correlating the measurement of the first proximal temperature Tpr1 with the first ambient temperature measurement Ta1 in order to obtain a corrective value and the step of transmitting the corrective value at least at the second heat-regulating device 8b or the plurality of heat-regulating devices 8. The corrective value can be given by the difference between the value of the first ambient temperature Ta1 and the measurement of the first proximal temperature Tpr1, or alternatively the corrective value can be a command parameter correlated to the difference between the first ambient temperature measurement Ta1 and the measurement of the first proximal temperature Tpr1.

In a further variant, the method can further comprise the step of correcting the measurement of the second proximal temperature Tpr2 or the plurality of proximal temperature measurements Tpr with the corrective value such as to estimate a second ambient temperature measurement in the second room or a plurality of ambient temperature measurements in the respective plurality of rooms 3 of the building. These steps of detecting a first measurement of ambient temperature Ta1 in a first room 3a by means of an ambient sensor 6 and correlating the measurement of the first proximal temperature Tpr1 with the ambient temperature such as to obtain a corrective value are performed by means of a calculating device 12 integrated in the thermostat or chrono-thermostat 5. The invention further relates to an operating software program for a regulating plant of the temperature in a plurality of rooms 3 of a building, configured such as to perform the steps of a method in accordance with what is set out herein above.

Figure 2:
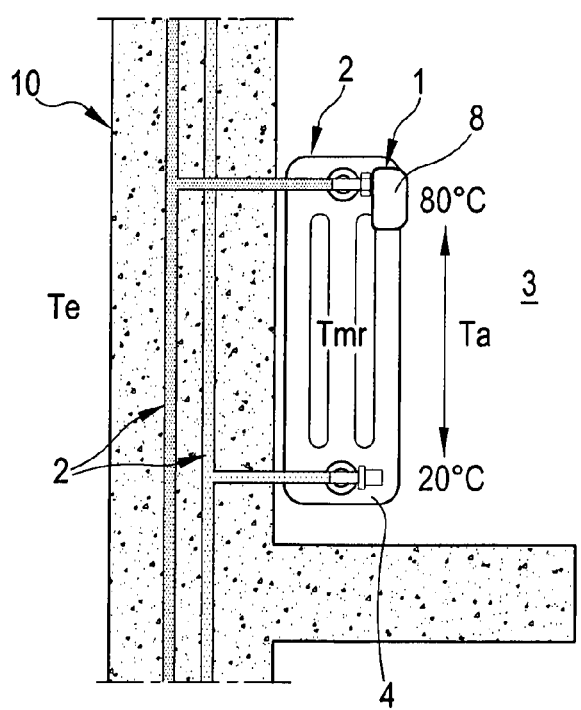
FIG. 2 is a section view of a wall of a room of the dwelling unit of FIG. 1, showing a radiator which is a part of the heating plant with a heat-regulating device.

In greater detail, in relation to the specific embodiments illustrated in the accompanying figures of the drawings, FIG. 1 schematically illustrates a dwelling unit 10 of a building, in which a plurality of radiators 4 are installed, being part of the heating plant 2, on each of which a heat-regulating device 8 is mounted. The thermostat or chrono-thermostat 5 is installed in the first room 3a of the dwelling unit. As illustrated in FIG. 2, the first radiator 4a is provided with a first heat-regulating device 8a and is wall-mounted in the first room 3a, the internal temperature of which is denoted by Ta, while the temperature of the external ambient is denoted by Te. The radiator receives hot water from the delivery circuit of the heating plant 2, which hot water is for example at 80° C. and sends water into the water recycling circuit, for example, at about 65° C. The average temperature of the radiator is denoted by Tmr. The first sensor 9a housed in the first heat-regulating device 8a measures a proximal temperature Tpr, intermediate between the Tmr radiator temperature and the temperature of the room Ta. As can be seen in FIG. 3, the heat-regulating device 8 can be provided with a manual setting of the set value Tset, which enables a partial modification of the temperature of the room in which it is installed with respect to the general setting set on the thermostat 5 for the dwelling unit.

The positions denoted by numbers from 0 to 6 in FIG. 3 correspond in general to positions which range from total closure of the check valve to complete opening thereof. FIG. 4 schematically illustrates a heat-regulating device in accordance with the prior art and having an independent function, not commanded by a thermostat 5, and the functioning thereof is also schematically shown. The heat-regulator or regulator is applied to a radiator having a mean temperature Tmr and installed in a room having a temperature Ta. The heat-regulator is provided with a sensor which detects a proximal temperature at the radiator Tpr, and is provided with a manual setting of a set value Tset. The heat-regulator regulates the opening or closing of the check valve of the radiator on the basis of the difference between Tset and Tpr.

A possible progression of the temperatures over time, with the use of the device of FIG. 4, is illustrated in FIG. 5. The diagram illustrated in FIG. 5 represents the progressions over time of the average temperature of the radiator Tmr, the proximal temperature Tpr and the temperature of the room Ta in an example of functioning.

In this example, we hypothesise that the knob of the heat-regulator has been positioned on a determined number, to which a radiator temperature Tmr of 50° C. corresponds, a "regulated" proximal temperature Tpr of 27° C. and an ambient temperature Ta of 20°. If all these conditions were to remain constant, the heat-regulator, having, as a set regulation, the same value as the proximal temperature Tmr, could guarantee maintenance of an ambient temperature Ta of the desired value Ta. However, given that the Tmr temperature of the radiator varies according to the external temperature variation Te, the action of the heat-regulator can actually be counter-productive: if the external temperature Te falls, the radiator temperature Tmr increases and, consequently, the regulated proximal temperature Tpr also increases, such that instead of opening the valve closes up to when the radiator cools, creating a continuous intermittence of opening and closing that, by reducing the heat supply, causes a reduction in the ambient temperature Ta.

If, on the other hand, the external temperature Te increases, the radiator temperature Tmr falls and consequently so does the regulated proximal temperature Tpr, so that instead of closing the valve remains open, causing an increase in the ambient temperature Ta. These faults are further exacerbated when the radiators are located in niches, behind a curtain or masked in some way.

FIG. 6 is a schematic illustration of an apparatus for regulating the temperature and the relative functioning in accordance with a first embodiment of the invention, in which the apparatus comprises an ambient thermostat 5 and a plurality of heat-regulators 8. The figure also illustrates a first radiator 4a, installed in a first room 3a having a temperature Ta1, and a second radiator 4b, installed in a second room 3b having a temperature Ta2. The radiators 4 are provided with respective heat-regulators. The first heat-regulator is operatively connected to the thermostat 5, with either a wireless or a wired connection. The thermostat 5 provides the first heat-regulator with a temperature set value Tset1 for the first room 3a and a measurement of the first ambient temperature Ta1, effectively measured in the first room 3a by the ambient sensor 6. The first heat-regulator device 8a regulates the functioning of the first radiator 4a on the basis of the data, i.e. proportionally to the Tset1−Ta1 difference (calculated by an integrated calculating device). In a variant, the thermostat 5 could provide the first heat-regulator directly with the difference between the values, or a further command proportional to the difference. Thus the functioning of the first heat-regulating device 8a is commanded directly by the thermostat 5 on the basis of the effective temperature in the first room Ta1, such as to regulate the desired temperature very rapidly and precisely.

In the invention, the first heat-regulating device 8a measures a first proximal temperature Tpr1, and transmits it, once more via wireless or wired connection, at least to the second heat-regulator, and potentially to any number of heat-regulators of the heating plant 2. The second heat-regulator device receives the measurement of the first proximal temperature Tpr1 and regulates the functioning of the second radiator 4b on the basis of this value too.

The second radiator 4b exhibits a temperature Tmr2 and is arranged in a room having a temperature Ta2. The second heat-regulating device 8b further comprises a manual setting of a set or offset value Ofs2, and is provided with a sensor which detects a proximal temperature Tpr2, intermediate between the Tmr2 and the Ta2 temperature. The second heat-regulating device 8b thus regulates the functioning of the second radiator 4b, acting on the relative check valve, for example on the basis of the formula (Tpr1+/−Ofs2)−Tpr2, and thus using the first proximal temperature Tpr1 as a set-point for correcting the intrinsic error of the proximal temperature Tmr1 due to the influence of the temperature of the radiator Tmr2.

In other terms, given that the functioning of the first heat-regulating device 8a is immune from the error due to the proximal temperature as it is commanded by the thermostat 5, it is possible to use the first proximal temperature Tpr1 as a set-point or a correction to be applied to the proximal temperatures measured by the heat-regulating devices 8 in the rooms 3 in which the thermostat 5 is not present. This is possible inasmuch as the temperature of the various radiators 4 in the various rooms 3 varies substantially correspondingly over time, as all the radiators 4 receive water substantially at the same temperature from the heating plant and therefore, apart from small variations due to the various offsets of each heat-regulating device, the radiators 4 substantially exhibit the same temperature Tmr at any moment (or in any case a very similar temperature).

In a variant, the second heat-regulating device 8b could receive the measurement of the first proximal temperature Tpr1 from the thermostat (which in turn receives it from the first heat-regulating device 8a), or it could receive a differential value correlated thereto, for example the difference between the Tpr1 and the Ta1, summing the difference to the Tpr2, or it could even receive a further value in some way correlated to or proportional to the first proximal temperature Tpr1 from the thermostat 5.

FIG. 7 is a similar view to FIG. 6 and it is relative to a second embodiment of the invention. The structure and the functioning of the temperature-regulating apparatus, in the second embodiment, are substantially alike to those of the first embodiment illustrated herein above, apart from the aspects described herein below.

In the second embodiment a chrono-thermostat 5 is provided in the place of a thermostat. The chrono-thermostat 5 is provided with a memory 13 which contains a set value or set-point Ofs for each heat-regulating device, and further can contain a timing programming of the temperature, such as for example a further time set value or time offset OfsH (further with respect to the set value Ofs). The transmission device of the chrono-thermostat 5 is further configured such as to transmit the data relating to the set values (Ofs2, Ofs3, Ofs4, etc . . . ) for each heat-regulating device and further such as to transmit the data relating to the timing program (the time set or offset value OfsH) to the heat-regulating devices 8.

The first heat-regulating device 8a receives, from the chrono-thermostat 5, the set value Tset1 and the effective temperature of the first room Ta1, and regulates the functioning of the first radiator 4a on the basis of the values and further on the basis of the time set or offset value OfsH, following the formula (Tset1+/−OfsH)−Ta1.

In the illustrated embodiment, the measurement of the first proximal temperature Tpr1 is transmitted to the chrono-thermostat 5 and from there to the various heat-regulators 8, but in further variants the temperature might be transmitted directly by the first heat-regulating device 8a to others, as in the first embodiment, or the chrono-thermostat 5 might transmit to the heat-regulators a differential value (Tpr1−Ta1) or another value correlated to the first proximal temperature Tpr1.

As for the second heat-regulating device 8b (and similarly the further heat-regulating devices), the functioning of the second radiator 4b is regulated for example on the basis of the formula (Tpr1+/−Ofs2+/−OfsH)−Tpr2, and therefore in this case too using the first proximal temperature Tpr1 as a set-point for correcting the intrinsic error of the proximal temperature Tmr1 due to the influence of the temperature of the radiator Tmr2. With respect to the first embodiment, the set value Ofs2 is supplied by the chrono-thermostat 5 and is no longer manually set, and further in the calculation formula for the command value of the actuator, the further time offset OfsH is also added.

The apparatus and the method of the invention are susceptible to numerous variants, all falling within the inventive concepts contained in the present application. The present invention enables obtaining one or more of the following advantages. Firstly, the invention enables a solving one or more of the problems encountered in the prior art. Further, the invention enables regulating the temperature in all the rooms of a dwelling unit efficiently, precisely and rapidly.

The invention further offers a high degree of comfort to the users, and guarantees the desired temperature in each room. The invention further enables a reduction of the energy consumption of the heating plant. The invention enables obtaining a greater duration of the components of the plant, reducing the risk of faults and the need for interventions for maintenance and repair.

Further, a method and apparatus of the invention are very flexible and adaptable to the needs of the various users. The invention is further simple and economical to realize.

The invention claimed is:

1. A method for regulating a temperature in a plurality of rooms (3) of a building, comprising the steps of:
    detecting a first ambient temperature measurement (Ta1) in a first room (3a) by means of an ambient sensor (6);
    commanding functioning of a first heat-regulating device (8a) mounted on a first radiator (4a) arranged in the first room (3a) and being part of a heating plant (2), in a correlated way with the first ambient temperature measurement (Ta1) and with a first set value (Tset1) of a desired temperature in the first room (3a); detecting a first proximal temperature (Tpr1) in the first room (3a) by means of a first sensor (9a) arranged in proximity of the first radiator (4a);
    detecting a second ambient proximal temperature measurement (Tpr2) in a second room (3b) by means of a second sensor (9b) arranged in proximity of a second radiator (4b), arranged in the second room (3b), being a part of the heating plant (2) and operatively connected to the first radiator (4a);
    correlating the measurement of the second proximal temperature (Tpr2) with a second set value (Ofs2) for a second heat-regulating device (8b) and also with the first proximal temperature measurement (Tpr1) in order to obtain a second command value for the second radiator (4b);
    commanding functioning of the second heat-regulating device (8b) mounted on the second radiator (4b) in a correlated way with the second command value.

2. The method of claim 1, wherein the second command value is calculated by correlating the measurement of the second proximal temperature (Tpr2) with the second set value (Ofs2) for the second heat-regulating device (8b) and also at least with a value that is correlated with the measurement of the first proximal temperature (Tpr1) or with a corrective value defined by a difference between the measurement of the first proximal temperature (Tpr1) and the first set value (Tset1) of a desired temperature for the first room (3a).

3. The method of claim 2, further comprising stages of:
  detecting a plurality of proximal temperature measurements (Tpr) in a plurality of rooms (3) of the building (10) by means of a plurality of respective sensors (9) arranged in proximity of a plurality of respective radiators (4) operatively connected to the first radiator (4a) and being part of the heating plant (2);
  correlating the plurality of proximal temperature measurements (Tpr) with a plurality of set values (Ofs) for a plurality of heat-regulating devices (8) and also at least with the measurement of the first proximal temperature (Tpr1) in order to obtain a plurality of command values for the plurality of radiators (4); and
  commanding functioning of a plurality of heat-regulating devices (8) mounted on the plurality of respective radiators (4) in the plurality of rooms (3) on the basis of the plurality of command values.

4. The method of claim 2, further comprising a step of transmitting at least the measurement of the first proximal temperature (Tpr1), and/or the corrective value and/or the first ambient temperature measurement (Ta1) and/or the time set value (OfsH) defined by the chrono-thermostat (5) to the second heat-regulating device (8b) or to a plurality of heat-regulating devices (8) by means of transmission devices (7, 11) of a wireless or wired type.

5. The method of claim 1, wherein the second command value is calculated by correlating the measurement of the second proximal temperature (Tpr2) with the second set value (Ofs2) for the second heat-regulating device (8b), with the measurement of the first proximal temperature (Tpr1) and also with a time set value (OfsH) defined by a chrono-thermostat (5).

6. The method of claim 5, further comprising stages of:
  detecting a plurality of proximal temperature measurements (Tpr) in a plurality of rooms (3) of the building (10) by means of a plurality of respective sensors (9) arranged in proximity of a plurality of respective radiators (4) operatively connected to the first radiator (4a) and being part of the heating plant (2);
  correlating the plurality of proximal temperature measurements (Tpr) with a plurality set values (Ofs) for a plurality of heat-regulating devices (8) and also at least with the measurement of the first proximal temperature (Tpr1) in order to obtain a plurality of command values for the plurality of radiators (4); and
  commanding functioning of a plurality of heat-regulating devices (8) mounted on the plurality of respective radiators (4) in the plurality of rooms (3) on the basis of the plurality of command values.

7. The method of claim 5, further comprising a step of transmitting at least the measurement of the first proximal temperature (Tpr1), and/or the corrective value and/or the first ambient temperature measurement (Ta1) and/or the time set value (OfsH) defined by the chrono-thermostat (5) to the second heat-regulating device (8b) or to a plurality of heat-regulating devices (8) by means of transmission devices (7, 11) of a wireless or wired type.

8. The method of claim 1, further comprising the stages of:
  detecting a plurality of proximal temperature measurements (Tpr) in a plurality of rooms (3) of the building (10) by means of a plurality of respective sensors (9) arranged in proximity of a plurality of respective radiators (4) operatively connected to the first radiator (4a) and being part of the heating plant (2);
  correlating the plurality of proximal temperature measurements (Tpr) with a plurality of set values (Ofs) for a plurality of heat-regulating devices (8) and also at least with the measurement of the first proximal temperature (Tpr1) in order to obtain a plurality of command values for the plurality of radiators (4); and
  commanding functioning of a plurality of heat-regulating devices (8) mounted on the plurality of respective radiators (4) in the plurality of rooms (3) on the basis of the plurality of command values.

9. The method of claim 1, further comprising a step of transmitting at least the measurement of the first proximal temperature (Tpr1), and/or the corrective value and/or the first ambient temperature measurement (Ta1) and/or a time set value (OfsH) defined by a chrono-thermostat (5) to the second heat-regulating device (8b) or to the plurality of heat-regulating devices (8) by means of transmission devices (7, 11) of a wireless or wired type.

10. An operating software program for a temperature regulating plant in a plurality of rooms (3) of a building (10), programmed to perform the steps of a method according to claim 1.

11. An apparatus for regulating temperature in a plurality of rooms (3) of a building (10) comprising:
  a thermostat or a chrono-thermostat (5) provided at least with an ambient sensor (6) designed to detect a first ambient temperature measurement (Ta1) in a first room (3a) and at least a central device (7) for data transmission;
  a first heat-regulating device (8a) mountable on a first radiator (4a) belonging to a heating plant (2) and arranged in the first room (3a), the first heat-regulating device (8a) being designed to regulate a functioning of the first radiator (4a) according to commands received from the thermostat or chrono-thermostat (5) and comprising at least a first sensor (9a) designed to detect a measurement of a first proximal temperature (Tpr1) of the first radiator (4a) and a first peripheral device (11a) for transmitting data, which first peripheral device (11a) is configured at least for transmitting the measurement of the first proximal temperature (Tpr1);
  at least a second heat-regulating device (8b) mountable on a second radiator (4b) of the heating plant (2), operatively connected to the first radiator (4a) and arranged in a second room (3b) of the building (10), the second heat-regulating device (8b) comprising at least a second sensor (9b) designed to detect a measurement of a second proximal temperature (Tpr2) of the second radiator (4b) and a second peripheral device (11b) for transmitting data, which second peripheral device (11b) is configured to receive at least the measurement of the first proximal temperature (Tpr1), the second heat-regulating device (8b) being configured such as to regulate a functioning of the second radiator (4b) in a correlated way at least with the measurement of the second proximal temperature (Tpr2), with a second set value (Ofs2) for the second heat-regulating device (8b) and with the measurement of the first proximal temperature (Tpr1) or a value correlated to the measurement of the first proximal temperature (Tpr1).

12. The apparatus of claim 11, comprising:
  a plurality of heat-regulating devices (8) mountable on a corresponding plurality of radiators (4) of the heating plant (2), operatively connected to the first radiator (4a) and arranged in a plurality of respective rooms (3) of the building, each heat-regulating device (8) of the plurality of heat-regulating devices (8) comprising a respective sensor (9) designed to detect a respective proximal temperature (Tpr) at the respective radiator (4) in the respective room (3) and further comprising a respective peripheral device (11) for transmitting data for receiving at least the measurement of the first proximal temperature (Tpr1), each heat-regulating device (8) being further configured such as to regulate the functioning of the respective radiator (4) in a way which is correlated with the respective proximal temperature (Tpr), with a respective set value (Ofs) for the relative heat-regulating device (8) and with the measurement of the first proximal temperature (Tpr1).

13. The apparatus of claim 12, wherein the commands sent by the thermostat or chrono-thermostat (5) to the first heat-regulating device via the central data transmission device (7) comprise the first ambient temperature measurement (Ta1) and a first set value (Tset1) of the first heat-regulating device (8a), or a differential value between the first ambient temperature measurement (Ta1) and the first set value (Tset1), or a command signal correlated with the first ambient temperature measurement (Ta1) and the first set value (Tset1).

14. The apparatus of claim 12, wherein the chrono-thermostat (5) is configured to define at least the set values (Ofs) of the heat-regulating devices (8) and wherein the central data transmission device (7) is configured such as to transmit the set values (Ofs) to each heat-regulating device (8) and/or wherein the chrono-thermostat (5) is configured to further define at least a time-set value (OfsH), variable over a time in conformity with a timed programming of the chrono-thermostat (5), and wherein the central data transmission device (7) is configured to transmit at least the time set value (OfsH) to each heat-regulator (8).

15. The apparatus of claim 11, wherein the commands sent by the thermostat or chrono-thermostat (5) to the first heat-regulating device via the central data transmission device (7) comprise the first ambient temperature measurement (Ta1) and a first set value (Tset1) of the first heat-regulating device (8a), or a differential value between the first ambient temperature measurement (Ta1) and the first set value (Tset1), or a command signal correlated with the first ambient temperature measurement (Ta1) and the first set value (Tset1).

16. The apparatus of claim 15 wherein the chrono-thermostat (5) is configured to define at least set values (Ofs) of the heat-regulating devices (8) and wherein the central data transmission device (7) is configured such as to transmit the set values (Ofs) to each heat-regulating device (8) and/or wherein the chrono-thermostat (5) is configured to further define at least a time set value (OfsH), variable over a time in conformity with a timed programming of the chrono-thermostat (5), and wherein the central data transmission device (7) is configured to transmit at least the time set value (OfsH) to each heat-regulator (8).

17. The apparatus of claim 11 wherein the chrono-thermostat (5) is configured to define at least set values (Ofs) of the heat-regulating devices (8) and wherein the central data transmission device (7) is configured such as to transmit the set values (Ofs) to each heat-regulating device (8) and/or wherein the chrono-thermostate (5) is configured to further define at least a time set value (OfsH), variable over a time in conformity with a timed programming of the chrono-thermostat (5), and wherein the central data transmission device (7) is configured to transmit at least the time set value (OfsH) to each heat-regulator (8).

* * * * *